(12) United States Patent
Wall et al.

(10) Patent No.: US 12,460,098 B2
(45) Date of Patent: Nov. 4, 2025

(54) JETTABLE COMPOSITION

(71) Applicant: Electra Polymers Ltd, Tonbridge (GB)

(72) Inventors: Christopher Wall, Tonbridge (GB); Clive Landells, Tonbridge (GB)

(73) Assignee: Electra Polymers Ltd, Tonbridge (GB)

( * ) Notice: Subject to any disclaimer, the term of this patent is extended or adjusted under 35 U.S.C. 154(b) by 574 days.

(21) Appl. No.: 17/296,497

(22) PCT Filed: Nov. 26, 2019

(86) PCT No.: PCT/GB2019/053329
§ 371 (c)(1),
(2) Date: May 24, 2021

(87) PCT Pub. No.: WO2020/109769
PCT Pub. Date: Jun. 4, 2020

(65) Prior Publication Data
US 2021/0403737 A1   Dec. 30, 2021

(30) Foreign Application Priority Data
Nov. 26, 2018   (GB) .................................... 1819195

(51) Int. Cl.

| | | |
|---|---|---|
| C09D 11/38 | (2014.01) | |
| C08F 2/48 | (2006.01) | |
| C08F 16/12 | (2006.01) | |
| C08F 20/10 | (2006.01) | |
| C08F 283/10 | (2006.01) | |
| C09D 11/101 | (2014.01) | |
| C09D 11/102 | (2014.01) | |
| C09D 11/30 | (2014.01) | |
| C09D 163/00 | (2006.01) | |
| H05K 3/28 | (2006.01) | |
| H05K 3/34 | (2006.01) | |

(52) U.S. Cl.
CPC .............. *C09D 11/38* (2013.01); *C08F 2/48* (2013.01); *C08F 16/12* (2013.01); *C08F 20/10* (2013.01); *C08F 283/10* (2013.01); *C09D 11/101* (2013.01); *C09D 11/102* (2013.01); *C09D 11/30* (2013.01); *C09D 163/00* (2013.01); *H05K 3/287* (2013.01); *H05K 3/3452* (2013.01)

(58) Field of Classification Search
CPC .................. C09D 11/30; C09D 163/00; C09D 133/00–26; C09D 11/101; C08L 63/00–10; C08F 22/10–26; C08F 20/10–40; C08F 16/12–32
See application file for complete search history.

(56) References Cited

U.S. PATENT DOCUMENTS

| | | | | |
|---|---|---|---|---|
| 3,969,300 A | * | 7/1976 | Nagata | C09D 133/066 525/518 |
| 4,888,407 A | * | 12/1989 | Yasuhisa | C08L 79/08 528/96 |
| 4,920,164 A | * | 4/1990 | Sasaki | C08L 71/123 523/466 |
| 6,121,446 A | * | 9/2000 | Flood | C07D 251/70 544/197 |
| 8,664,288 B2 | | 3/2014 | Nesvadba et al. | |
| 9,453,137 B2 | | 9/2016 | Choi et al. | |
| 10,005,911 B2 | | 6/2018 | Shimura et al. | |
| 2009/0278904 A1 | | 11/2009 | Oh et al. | |
| 2016/0046813 A1 | | 2/2016 | Tanikawa et al. | |
| 2016/0049297 A1 | | 2/2016 | Tanikawa et al. | |
| 2017/0158922 A1 | | 6/2017 | Tanikawa et al. | |
| 2017/0233599 A1 | | 8/2017 | Tanikawa et al. | |
| 2017/0298005 A1 | | 10/2017 | Tanikawa et al. | |

FOREIGN PATENT DOCUMENTS

| | | | | |
|---|---|---|---|---|
| EP | 2902455 A1 | | 8/2015 | |
| JP | 2007-194174 A | | 8/2007 | |
| JP | 2011231248 A | * | 11/2011 | ............ B05D 1/185 |
| JP | 2012-184411 A | | 9/2012 | |
| JP | 2017186481 A | | 10/2017 | |
| WO | WO-2016111122 A1 | * | 7/2016 | ............... C08F 2/44 |
| WO | 2017009097 A1 | | 1/2017 | |
| WO | 2015163276 A1 | | 4/2017 | |

OTHER PUBLICATIONS

Partial machine translation of JP-2011231248-A (generated Dec. 11, 2023).*
Partial machine translation of WO 2016111122 A1 (Year: 2016).*
Office Action dated Jun. 2, 2023 issued in equivalent Taiwanese Application No. 108142965 and English Translation.
Office Action dated Jun. 13, 2023 issued in equivalent Japanese Application No. 2021-529735 and English Translation.
Jung, K.,I, et al., "Characteristics of dual-curable blocked isocyanate with thermal radical initiator for low-temperature curing of automotive coatings", Progress in Organic Coatings, 125 (2018) pp. 160-166.
Office action dated Jan. 12, 2022 issued in equivalent Chinese application No. 201980077757.1 and English translation thereof.
Kim, B., et al., "Thermal Radical Initiator Derivatives Based on O-Imino-Isourea: Synthesis, polymerization, and Characterization", J. Polym. Sci. Part A: Polym. Chem. 54 (2016) pp. 3593-3600.
International Search Report and Written Opinion mailed Feb. 25, 2020 in corresponding PCT/GB2019/053329.
GPS Safety Summary, "Photocure resins SR531 cyclic trimethylolpropane formal acrylate data sheet", Arkema 2014 pp. 1-5.
Kadurina, T. I., "Curing of epoxy oligomers by isocyanates", Polymer, vol. 33, No. 18 (1992) pp. 3858-3864.

(Continued)

*Primary Examiner* — Kregg T Brooks
(74) *Attorney, Agent, or Firm* — Merchant & Gould P.C.

(57) ABSTRACT

A jettable composition is described, comprising a reactive monomer, oligomer or prepolymer containing at least one epoxy or oxetane functional group; a free radical polymerizable compound; a thermal cross-linking agent; and a radical initiator, along with an electronic device having the composition jetted thereon and a method of manufacturing an electronic device.

20 Claims, No Drawings

(56) References Cited

OTHER PUBLICATIONS

Isocyanate CAS # 3779-63-3 HDI isocyanurate trimer, http://www.wernerblank.com/polyur/chemistry/isocyanate/cas3779633 Jul. 2006.
Isocyanate CAS # 4035-89-6 HDI biuret triisocyanate, http://www.wernerblank.com/polyur/chemistry/isocyanate/cas4035896 Jul. 2006.
CYMEL NF 2000 crosslinking agent AllnexTechnical Data Sheet (MITM10050), www.allnex.com (2013).
Safety Data Sheet: ELJ11-5895 W—provisional SDS, EC No. 1907/2006, Annex II, HS&E Manager Nov. 2017.
GB Search Report mailed May 24, 2019 in corresponding GB 1819195.7.
Office Action issued in corresponding Korean Patent Application No. 10-2021-7019327, mailed Sep. 9, 2024.

* cited by examiner

JETTABLE COMPOSITION

RELATED APPLICATIONS

The present application is a U.S. National Stage filing under 35 U.S.C. § 371 of International Application No. PCT/GB2019/053329 filed 26 Nov. 2019, which claims priority to GB Application No. 1819195.7 filed 26 Nov. 2018.

TECHNICAL FIELD OF THE INVENTION

The present invention relates to the use of a jettable composition which is photocurable and thermosetting. The composition is suitable for use as an insulating coating such as a solder resist, in the manufacture of an electronic device such as a printed circuit board.

BACKGROUND OF THE INVENTION

Solder resists or solder mask are permanent protective coatings that perform a number of functions during the fabrication, assembly and end use of printed circuit boards (PCBs). One of the main purposes of solder mask is to protect the circuitry from interacting with solder during the assembly process. However, it also helps to protect the laminate, holes and traces from collecting contaminants and from degrading during the service life of the PCB. A solder mask also acts as an insulator of known dielectric property between components and traces of the PCB.

Traditional photolithographic developing processes requires a photo-mask, a photoresist containing a photosensitive resin, applied by screen printing or some other coating process, and a method for patterning the resist ink. In recent times, ink jet printing has become a popular technique for depositing solder mask compositions onto PCBs because of its simplicity, convenience and low cost. Since this method uses CAD data directly, to create the image of the solder resist ink on the printed circuit board, it has the advantage of reducing both the number of process steps and materials required, thus reducing the labour, time and costs involved in the process compared to a photolithographic developing process.

However, inks for application by ink jet printing are subjected to a number of restrictions on their physical properties, such as viscosity and surface tension, depending on the type of printhead being used. For most ink jet printheads, the viscosity of these inks is typically no more than about 5-15 mPa·s at the time of application. This viscosity is much lower than that of inks used in screen printing, around 20,000 mPa·s, and thus restricts the type and number of components which can be used in such inks. However, other printheads have recently been developed which allow the use of higher viscosity inks than those typically used.

Diluting the ink with a large amount of diluent to try and achieve the low viscosity required, results in the deterioration of the physical properties required of the solder resist. If it is diluted with a volatile solvent, the nonvolatile content is reduced and, as a result, it is more difficult to attain a sufficient film thickness. In addition, the use of volatile solvents can introduce hazards such as flammability and toxicity.

UV curable inks are preferred for the design of solder mask inks as they allow rapid cure and a high degree of crosslinking, resulting in excellent chemical resistance and mechanical properties. However, compatibility with the high temperature soldering process, while maintaining all physical properties, is especially challenging.

SUMMARY OF THE INVENTION

The present invention aims to overcome one or more of these problems.

According to a first aspect of the present invention there is provided a jettable composition, comprising:
  a reactive monomer, oligomer or prepolymer containing at least one epoxy or oxetane functional group;
  a free radical polymerizable compound;
  a thermal cross-linking agent comprising one or more agent selected from an isocyanate compound and a triazine compound; and
  a radical initiator.

According to a second aspect of the present invention there is provided an electronic device, comprising a dielectric substrate having on a first surface thereof an electrically conductive pattern and the composition of the first aspect.

According to a third aspect of the present invention there is provided a method of manufacturing an electronic device, comprising:
  jetting a jettable composition according to the first aspect onto a dielectric substrate having an electrically conductive pattern on a first surface thereof; and
  curing the jetted composition.

DETAILED DESCRIPTION OF THE INVENTION

Definitions

As used herein, "monomer" is to be understood as referring to a unit or building block which is combinable with other monomers, to form a longer chain molecule of repeating units, for example to form an oligomer, a prepolymer or a polymer.

As used herein, "oligomer" is to be understood as referring to a compound comprising a relatively low number of repeating monomeric units (typically 5-100) and having an relative molecular mass intermediate a monomer or prepolymer, the properties of which would vary with the removal of one or a few of the units.

As used herein, the term "prepolymer" refers to a repeating system of monomers or oligomers that is capable of further polymerization to a high molecular weight polymer.

It will be understood that the monomer, oligomer and prepolymer defined above may contain orthogonal functional groups in side chains that allow for cross-linking with other components in a composition.

As used herein, the term "monofunctional" in e.g. monofunctional polymerizable compound means that the polymerizable compound includes one polymerizable group.

As used herein, the term "difunctional" in e.g. difunctional polymerizable compound means that the polymerizable compound includes two polymerizable groups.

As used herein, the term "polyfunctional" in e.g. polyfunctional polymerizable compound means that the polymerizable compound includes more than two polymerizable groups.

As used herein, the term "alkyl" means all variants possible for each number of carbon atoms in the alkyl group i.e. methyl, ethyl, for three carbon atoms: n-propyl and isopropyl; for four carbon atoms: n-butyl, isobutyl and tertiary-butyl; for five carbon atoms: n-pentyl, 1,1-dimethylpropyl, 2,2-dimethylpropyl and 2-methyl-butyl, etc.

As used herein, and unless otherwise specified, a substituted or unsubstituted alkyl group is preferably a C1 to C6-alkyl group.

As used herein, and unless otherwise specified a substituted or unsubstituted alkenyl group is preferably a C2 to C6-alkenyl group.

As used herein, and unless otherwise specified a substituted or unsubstituted alkynyl group is preferably a C2 to C6-alkynyl group.

As used herein, and unless otherwise specified a substituted or unsubstituted aralkyl group is preferably a phenyl or naphthyl group including one, two, three or more C1 to C6-alkyl groups.

As used herein, and unless otherwise specified a substituted or unsubstituted alkaryl group is preferably a C7 to C20-alkyl group including a phenyl group or naphthyl group.

As used herein, and unless otherwise specified a substituted or unsubstituted aryl group is preferably a phenyl group or naphthyl group.

As used herein, and unless otherwise specified a substituted or unsubstituted heteroaryl group or heterocyclic group is preferably a five- or six-membered ring substituted by one, two or three oxygen atoms, nitrogen atoms, sulphur atoms, selenium atoms or combinations thereof.

As used herein, the term "substituted", in e.g. substituted alkyl group means that the alkyl group may be substituted by other atoms than the atoms normally present in such a group, i.e. carbon and hydrogen. For example, a substituted alkyl group may include a halogen atom or a thiol group. An unsubstituted alkyl group contains only carbon and hydrogen atoms.

As used herein, and unless otherwise specified a substituted alkyl group, a substituted alkenyl group, a substituted alkynyl group, a substituted aralkyl group, a substituted alkaryl group, a substituted aryl and a substituted heteroaryl group may be independently substituted by one or more constituents selected from the group consisting of methyl, ethyl, n-propyl, isopropyl, n-butyl, isobutyl and tertiary-butyl, ester, amide, ether, thioether, ketone, aldehyde, sulfoxide, sulfone, sulfonate ester, sulphonamide, —Cl, —Br, —I, —OH, —SH, —CN and —NO$_2$.

Compositions, electronic devices and methods in accordance with the present disclosure will now be described.

Jettable Composition

According to a first aspect of the present invention there is provided a jettable composition, comprising:
 a reactive monomer, oligomer or prepolymer containing at least one epoxy or oxetane functional group;
 a free radical polymerizable compound;
 a thermal cross-linking agent comprising one or more agent selected from an isocyanate compound and a triazine compound; and
 a radical initiator.

The jettable composition may also be referred to as a curable composition, for example a radiation curable or a thermally curable composition, given the various reactive monomers and polymerizable components of the composition. The composition may also be referred to as an insulating composition, a solder mask composition, or a solder resist composition.

Reactive Monomer, Oligomer or Prepolymer Containing at Least One Epoxy or Oxetane Functional Group The jettable composition comprises a reactive monomer, oligomer or prepolymer containing at least one epoxy or oxetane functional group, which is thermally curable, i.e. thermosetting. The monomers, oligomers and/or prepolymers may possess different degrees of functionality. For example, a mixture including combinations of mono-, di-, tri- and higher functional monomers, oligomers and/or prepolymers may be used in the composition.

Examples of monomers, oligomers or prepolymers containing at least one epoxide group include bisphenol-A type epoxy resins, bisphenol-F type epoxy resins, phenol or cresol novolac type epoxy resins, cycloaliphatic epoxy compounds such as bis-(3,4-epoxycyclohexyl)-adipate, 3,4-epoxycyclohexylmethyl-3,4-epoxycyclohexane carboxylate, poly[(2-oxiranyl)-1,2-cyclohexanediol]-2-ethyl-2-(hydroxymethyl)-1,3-propanediol ether, 7-oxabicyclo[4.1.0]hept-3-ylmethyl 7-oxabicyclo[4.1.0] heptane-3-carboxylate; ether derivatives including diol derivatives such as 1,4-butanediol diglycidylether and neopentyl glycol diglycidylether; glycidyl ethers such as n-butyl glycidyl ether, distilled butyl glycidyl ether, 2-ethylhexyl glycidyl ether, C8-C10 aliphatic glycidyl ether, C12-C14 aliphatic glycidyl ether, o-cresyl glycidyl ether, p-tertiary butyl phenyl glycidyl ether, nonyl phenyl glycidyl ether, phenyl glycidyl ether, cyclohexanedimethanol diglycidyl ether, polypropylene glycol diglycidyl ether, poly glycol diglycidyl ether, dibromo neopentyl glycol diglycidyl ether, trimethylopropane triglycidyl ether, castor oil triglycidyl ether, propoxylated glycerin triglycidyl ether, sorbitol polyglycidyl ether, glycidyl ester of neodecanoic acid; and glycidyl amines such as epoxidized meta-xylene diamine. It will be understood that the above list is by way of example and that other suitable epoxy materials are available. Other epoxy materials can be found in U.S. Pat. No. 10,005,911 B2, the contents of which in this regard are incorporated herein by reference.

Examples of monomers, oligomers or prepolymers containing at least one oxetane group include 3,3'-oxybis(methylene)bis(3-ethyloxetane), 1,4-bis(((3-ethyloxetan-3-yl)methoxy)methyl)benzene, 3-ethyl-3-[(phenylmethoxy)methyl]-oxetane, 3-ethyl-3-[(2-ethylhexyloxy) methyl]oxetane and bis[1-ethyl(3-oxetanyl)]methylether.

In one example, the reactive monomer, oligomer or prepolymer containing at least one epoxy or oxetane functional group comprises one or more of a bisphenol-A type epoxy resin, bisphenol-F type epoxy resin, phenol or cresol novolac type epoxy resin, a dicyclopentadiene type epoxy, cycloaliphatic epoxy compound, epoxy ether, epoxy silane, glycidyl ether, glycidyl ester, glycidyl amine and oxetane monomer. In one example, the reactive monomer, oligomer or prepolymer containing at least one epoxy or oxetane functional group comprises one or more phenol or cresol novolac type epoxy resin.

In some examples, the jettable composition comprises 20 wt % or less of one or more reactive monomer, oligomer or prepolymer of an epoxy or oxetane resin, for example from 1 wt % to 18 wt %, for example from 2 wt % to 17 wt %, for example from 3 wt % to 16 wt %, for example from 4 wt % to 15 wt %, for example from 5 wt % to 14 wt %, for example from 6 wt % to 13 wt %, for example from 7 wt % to 12 wt %, for example from 8 wt % to 10 wt %.

In one example, the reactive monomer, oligomer or prepolymer of an epoxy resin comprises an epoxy equivalent weight of less than 4000 g/Eq, for example less than 3000 g/Eq, for example less than 2000 g/Eq, for example less than 1000 g/Eq, for example less than 500 g/Eq, for example less than 250 g/Eq. In some examples, the reactive monomer, oligomer or prepolymer of an epoxy resin comprises an epoxy equivalent weight of greater than 50 g/Eq, for example greater than 150 g/Eq, for example greater than 170 g/Eq, for example greater than 180 g/Eq. In some examples, the reactive monomer, oligomer or prepolymer of an epoxy resin comprises an epoxy equivalent weight of from 180 g/Eq to 240 g/Eq, for example from 190 g/Eq to 230 g/Eq.

Free Radical Polymerizable Compound

The composition comprises a free radical polymerizable compound. The free radical polymerizable compounds may comprise one or more free radical polymerizable monomers, oligomers and/or prepolymers. These monomers, oligomers and/or prepolymers may possess different degrees of functionality. A mixture including combinations of mono-, di-, tri- and higher functional monomers, oligomers and/or prepolymers may be used. The viscosity of the radiation curable inkjet ink may be adjusted by varying the ratio between the monomers and oligomers.

The free radical polymerizable compound may comprise at least one vinyl ether compound or at least one (meth)acrylate group compound. The free radical polymerizable compound may not contain a free hydroxyl group.

Examples of suitable free radical polymerizable compounds can be found in U.S. Pat. No. 10,005,911, the contents of which are incorporated herein by reference.

In particular, examples of suitable free radical polymerizable compounds include vinyl ethers such as 4-hydroxybutyl vinyl ether(HBVE), 1,4-butanediol vinyl ether, 1,4-butanediol divinyl ether (BDDVE), n-butyl vinyl ether (NBVE), iso-butyl vinyl ether (IBVE), tert-butyl vinyl ether, cyclohexyl vinyl ether (CHVE), cyclohexanedimethanol divinyl ether (CHDM-di), 1,4-cyclohexanedimethanol mono vinyl ether (CHDM-mono), ethylene glycol vinyl ether, di(ethylene glycol) vinyl ether, di(ethylene glycol) divinyl ether (DVE-2), tri(ethylene glycol) divinyl ether (DVE-3), phenyl vinyl ether, and ethyl vinyl ether (EVE), 2-ethylhexyl vinyl ether (EHVE), dodecyl vinyl ether (DDVE), octadecyl vinyl ether (ODVE), bis[4-(vinyloxy)butyl] 1,6-hexanediylbiscarbamate, bis[4-(vinyloxy)butyl] isophthalate, bis[4-(vinyloxy)butyl] (methylenedi-4,1-phenylene)biscarbamate, bis[4-(vinyloxy)butyl] succinate, bis [4-(vinyloxy)butyl]terephthalate, bis[4-(vinyloxymethyl)cyclohexylmethyl] glutarate, 2-chloroethyl vinyl ether, diethyl vinyl orthoformate, ethyl-1-propenyl ether, propyl vinyl ether, tris[4-(vinyloxy)butyl] trimellitate.

Examples of suitable free radical polymerizable compounds include monofunctional and/or polyfunctional acrylate monomers, oligomers or prepolymers, such as isoamyl acrylate, stearyl acrylate, lauryl acrylate, octyl acrylate, decyl acrylate, isoamylstyl acrylate, isostearyl acrylate, 2-ethylhexyl-diglycol acrylate, 2-hydroxybutyl acrylate, 2-acryloyloxyethylhexahydrophthalic acid, butoxyethyl acrylate, ethoxydiethylene glycol acrylate, methoxydiethylene glycol acrylate, methoxypolyethylene glycol acrylate, methoxypropylene glycol acrylate, phenoxyethyl acrylate, tetrahydrofurfuryl acrylate, isobornyl acrylate, 2-hydroxyethyl acrylate, 2-hydroxypropyl acrylate, 2-hydroxy-3-phenoxypropyl acrylate, vinyl ether acrylate, 2-acryloyloxyethylsuccinic acid, 2-acryloyxyethylphthalic acid, 2-acryloxyethyl-2-hydroxyethyl-phthalic acid, lactone modified flexible acrylate, and t-butylcyclohexyl acrylate, triethylene glycol diacrylate, tetraethylene glycol diacrylate, polyethylene glycol diacrylate, dipropylene glycol diacrylate, tripropylene glycol diacrylate, polypropylene glycol diacrylate, 1,4-butanediol diacrylate, 1,6-hexanediol diacrylate, 1,9-nonanediol diacrylate, neopentyl glycol diacrylate, dimethylol-tricyclodecane diacrylate, bisphenol A EO (ethylene oxide) adduct diacrylate, bisphenol A PO (propylene oxide) adduct diacrylate, hydroxypivalate neopentyl glycol diacrylate, propoxylated neopentyl glycol diacrylate, alkoxylated dimethyloltricyclodecane diacrylate and polytetramethylene glycol diacrylate, trimethylolpropane triacrylate, EO modified trimethylolpropane triacrylate, tri (propylene glycol) triacrylate, caprolactone modified trimethylolpropane triacrylate, pentaerythritol triacrylate, pentaerithritol tetraacrylate, pentaerythritolethoxy tetraacrylate, dipentaerythritol hexaacrylate, ditrimethylolpropane tetraacrylate, glycerinpropoxy triacrylate, and caprolactam modified dipentaerythritol hexaacrylate, or an N-vinylamide such as, N-vinylcaprolactam or N-vinylformamide; or acrylamide or a substituted acrylamide, such as acryloylmorpholine.

Other suitable monofunctional acrylates include caprolactone acrylate, cyclic trimethylolpropane formal acrylate, ethoxylated nonyl phenol acrylate, isodecyl acrylate, isooctyl acrylate, octyldecyl acrylate, alkoxylated phenol acrylate, tridecyl acrylate and alkoxylated cyclohexanone dimethanol diacrylate.

Other suitable difunctional acrylates include alkoxylated cyclohexanone dimethanol diacrylate, alkoxylated hexanediol diacrylate, dioxane glycol diacrylate, dioxane glycol diacrylate, cyclohexanone dimethanol diacrylate, diethylene glycol diacrylate and neopentyl glycol diacrylate.

Other suitable trifunctional acrylates include propoxylated glycerine triacrylate and propoxylated trimethylolpropane triacrylate.

Other higher functional acrylates include di-trimethylolpropane tetraacrylate, dipentaerythritol pentaacrylate, ethoxylated pentaerythitol tetraacrylate, methoxylated glycol acrylates and acrylate esters.

Furthermore, methacrylates corresponding to the above-mentioned acrylates may be used with these acrylates. Examples include methoxypolyethylene glycol methacrylate, methoxytriethylene glycol methacrylate, hydroxyethyl methacrylate, phenoxyethyl methacrylate, cyclohexyl methacrylate, tetraethylene glycol dimethacrylate, and polyethylene glycol dimethacrylate.

Furthermore, the composition may also contain polymerizable oligomers. Examples of these polymerizable oligomers include epoxy acrylates, aliphatic urethane acrylates, aromatic urethane acrylates, polyester acrylates, and straight-chained acrylic oligomers.

Suitable examples of styrene compounds are styrene, p-methylstyrene, p-methoxystyrene, β-methylstyrene, p-methyl-β-methylstyrene, α-methylstyrene and p-methoxy-β-methylstyrene.

Suitable examples of vinylnaphthalene compounds are 1-vinylnaphthalene, a-methyl-1-vinylnaphthalene, b-methyl-1-vinylnaphthalene, 4-methyl-1-vinylnaphthalene and 4-methoxy-1-vinylnaphthalene.

Suitable examples of N-vinyl heterocyclic compounds are N-vinylcarbazole, N-vinylpyrrolidone, N-vinylindole, N-vinylpyrrole, N-vinylphenothiazine, N-vinylacetoanilide, N-vinylethylacetoamide, N-vinylsuccinimide, N-vinylphthalimide, N-vinylcaprolactam and N-vinylimidazole.

In some examples, the free radical polymerizable compound comprises one or more (meth)acrylate group. In some examples, the free radical polymerizable compound comprising one or more (meth)acrylate group does not contain a hydroxyl substituent. In some examples, the free radical polymerizable compound comprises one or more compound containing a vinylether group and a (meth)acrylate group, for example 2-(2-vinyloxyethoxy)ethyl acrylate. Other examples include: 2-vinyloxyethyl (meth)acrylate; 3-vinyloxypropyl (meth)acrylate; 1-methyl-2-vinyloxyethyl(meth) acrylate; 2-vinyloxypropyl (meth)acrylate; 4-vinyloxybutyl (meth)acrylate; 1-methyl-3-vinyloxypropyl (meth)acrylate; 1-vinyloxymethylpropyl (meth)acrylate; 2-methyl-3-vinyloxypropyl (meth)acrylate; 3-methyl-3-vinyloxypropyl (meth)acrylate; 1,1-dimethyl-2-vinyloxyethyl (meth)acrylate; 3-vinyloxybutyl (meth)acrylate; 1-methyl-2-vinyloxypropyl (meth)acrylate; 2-vinyloxybutyl (meth)acrylate; 4-vinyloxycyclohexyl (meth)acrylate; 5-vinyloxypentyl (meth)acrylate; 6-vinyloxyhexy (meth)acrylate; 4-vinyloxymethylcyclohexyl methyl (meth)acrylate; p-vinyloxymethylphenylmethyl (meth)acrylate; 2-(vinyloxyethoxy)ethyl (meth)acrylate; 2-(vinyloxyisopropoxy)ethyl (meth)acrylate; 2-(vinyloxyethoxy)propyl (meth)acrylate; 2-(vinyloxyethoxy)isopropyl (meth)acrylate; 2-(vinyloxyisopropoxy)propyl (meth)acrylate; 2-(vinyloxyisopropoxy)isopropyl (meth)acrylate; 2-(vinyloxyethoxyethoxy)ethyl(meth)acrylate; 2-(vinyloxyethoxyisopropoxy)ethyl (meth)acrylate; 2-(vinyloxyethoxyisopropoxy)propyl (meth)acrylate; 2-(vinyloxyethoxyethoxy)isopropyl (meth)acrylate; 2-(vinyloxyethoxyisopropoxy)isopropyl (meth)acrylate; 2-(vinyloxyethoxyethoxyethoxy)ethyl (meth)acrylate; polyethylene glycol monovinyl ether (meth)acrylate; and polypropylene glycol monovinyl ether (meth)acrylate.

In some examples, the free radical polymerizable compound is selected from the group consisting of phenoxyethyl acrylate and 2-(2-vinyloxyethoxy)ethyl acrylate. In some examples, the free radical polymerizable compound comprises phenoxyethyl acrylate and 2-(2-vinyloxyethoxy)ethyl acrylate.

In some examples, the free radical polymerizable compound is present in an amount of 50 wt % or more, for example 60 wt % or more, for example 70 wt % or more, for example 75 wt % or more, for example 80% or more, of the total weight of the composition.

Thermal Cross-Linking Agent

The jettable composition comprises a thermal cross-linking agent. In some examples, the thermal cross-linking agent comprises one or more agent selected from an isocyanate compound, or a triazine compound. In some examples, the thermal cross-linking agent comprises one or more compounds having different degrees of functionality. Thus, a mixture of compounds having mono-, di-, tri- and higher cross-linking compounds are envisaged.

In some examples, the isocyanate compound comprises one or more monomeric and polyfunctional aliphatic/alicyclic isocyanate and aromatic isocyanates.

Examples of monomeric aliphatic/alicyclic isocyanates include 1,6-hexamethylene diisocyanate (HDI or HMDI), isophorone diisocyanate (IPDI), methylcyclohexane 2,4-(2,6)-diisocyanate (hydrogenated TDI), 4,4'-methylenebis(cyclohexylisocyanate) (hydrogenated MDI), 1,3-(isocyanatomethyl)cyclohexane (hydrogenated XDI), norbornene diisocyanate (NDI), lysine diisocyanate (LDI), trimethylhexamethylene diisocyanate and (TMDI), dimer acid diisocyanate (DDI), Examples of aliphatic/alicyclic polyisocyanates are N,N',N"-tris(6-isocyanate-hexamethylene) HDI biuret (biuret), HDI trimer, HDI uretdione and IPDI trimer.

Examples of aromatic isocyanates include, toluene diisocyanate (TDI), 4,4'-diphenylmethane diisocyanate (MDI), and xylylene diisocyanate (XDI).

In some examples, the isocyanate compound is a blocked isocyanate compound or an unblocked isocyanate compound. A blocking agent used to form a blocked isocyanate is a protective group which is removed at elevated temperature during the thermal curing process and which serves to improve the storage stability of the composition.

Examples of the blocking agent include alcohols such as ethanol, n-propanol, isopropanol, t-butanol, and isobutanol; phenols such as phenol, chlorophenol, cresol, xylenol, and p-nitrophenol; alkylphenols such as p-t-butylphenol, p-sec-butylphenol, p-sec-amylphenol, p-octylphenol, and p-nonylphenol; basic nitrogen-containing compounds such as 3-hydroxypyridine, 8-hydroxyquinoline, and 8-hydroxyquinaldine; active methylene com-pounds such as diethyl malonate, ethyl acetoacetate, and acetylacetone; acid amides such as acetamide, acrylamide, and acetanilide, acid imides such as succinimide and maleic imide; imidazoles such as 2-ethylimidazole and 2-ethyl-4-methylimidazole; pyrazoles such as pyrazole, 3-methylpyrazole, and 3,5-dimethylpyrazole; lactams such as 2-pyrrolidone and 8-caprolactam; oximes of ketone or aldehyde, such as acetoxime, methyl ethyl ketone oxime, cyclohexanone oxime, and acetaldoxime; ethyleneimine; and bisulfite.

In one example, the thermal crosslinking agent is HDI biuret blocked with 3,5-dimethylpyrazole available commercially from Baxenden Chemicals Ltd as Trixene BI 7960.

In some examples, the thermal cross-linking agent is present in the composition in an amount of 10 wt % or less, for example 5 wt % or less. In some examples, the thermal cross-linking agent is a blocked isocyanate used in an amount of 0.1 to 10 parts by weight and preferably 0.5 to 5 parts by weight, based on 100 parts by weight of the total composition.

In some examples, the thermal cross-linking agent comprises a triazine compound. For example, the triazine compound may be a tris(alkoxycarbonylamino) triazine. Examples of tris(alkoxycarbonylamino) triazine (TACT) compounds are given by the structure below.

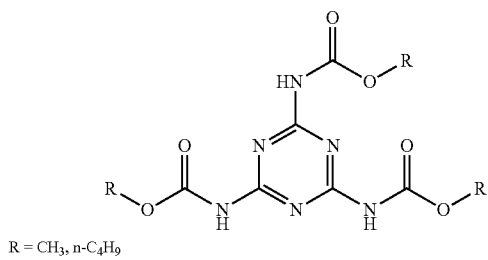

R = $CH_3$, n-$C_4H_9$

Such material(s) are sold by Allnex under the name Cymel NF 2000 and by BASF under the name Larotact 150. In addition to improving physical and chemical resistance to the solder mask, triazine compounds can also be used to prevent the copper circuitry under the solder mask from oxidising during thermal curing when the composition does not comprise a hydroxy-containing (meth)acrylate monomer. Thus, in one example the composition comprises a thermal cross-linking agent in the form of a triazine compound in the absence of a hydroxy-containing monomer radical polymerizable compound. In one example, the composition comprises a thermal cross-linking agent in the form of a triazine compound and a hydroxy-containing monomer radical polymerizable compound in a molar ratio of triazine:hydroxy of no more than 1:2, for example in a molar ratio of 1:1. Thus, for a monomer radical polymerizable compound having two hydroxyl groups, the molar ratio of triazine:monomer radical polymerizable compound is no more than 1:1, preferably 1:<1.

In some examples, the thermal cross-linking agent comprises an isocyanate compound and a triazine compound. In some examples, the thermal cross-linking agent comprises an isocyanate compound and a triazine compound in the absence of a hydroxy-containing (meth)acrylate monomer radical polymerizable compound.

In some examples, the thermal cross-linking agent is a triazine compound and is present in the composition in an amount of 10 wt % or less, for example 5 wt % or less, for example in a range of from 2 wt % to 5 wt %, for example in a range of from 3 wt % to 5 wt %. In some examples, the thermal cross-linking agent is a triazine compound and is present in the composition in an amount of 5 wt % or less, for example 3 wt % or less, for example in a range of from 1 wt % to 3 wt %, for example about 2 wt % based on the total solids content of the composition.

The thermal curing agents increase the degree of cross-linking in the cured film and improve various important solder resist properties such as resistance to heat, hardness, resistance to soldering heat, resistance to chemicals, electrical insulating properties, and resistance to electroless plating and immersion plating.

Radical Initiator

The radiation curable jettable composition contains at least one radical initiator, but may contain an initiating system including a plurality of radical initiators and/or co-initiators.

The radical initiator may be a free radical photoinitiator, more specifically a Norrish type I initiator or a Norrish type II initiator. A free radical photoinitiator is a chemical compound that initiates polymerization of monomers and oligomers when exposed to actinic radiation by the formation of a free radical. A Norrish Type I initiator is an initiator which cleaves after excitation, yielding the initiating radical immediately. A Norrish type II-initiator is a photoinitiator which is activated by actinic radiation and forms free radicals by hydrogen abstraction from a second compound that becomes the actual initiating free radical. This second compound is called a polymerization synergist or co-initiator. Both type I and type II photoinitiators can be used in the described methods and compositions, alone or in combination.

Specific examples of photoinitiators may include, but are not limited to, the following compounds or combinations thereof: acetophenones such as acetophenone, 2,2-dimethoxy-2-phenyl acetophenone, 2,2-diethoxy-2-phenyl acetophenone, and 1,1-dichloroacetophenone, anthraquinones such as 2-methyl-anthraquinone, 2-ethylanthraquinone, 2-t-butylanthraquinone, and 1-chloroanthraquinone, benzoin and alkyl ethers thereof such as benzoin, benzoin methyl ether, benzoin ethyl ether, and benzoin isopropyl ether, benzophenone and substituted benzophenones, 1-hydroxycyclohexyl phenyl ketone, thioxanthones such as 2,4-dimethyl-thioxanthone, 2,4-diethylthioxanthone, 2-chlorothioxanthone, and 2,4-diisopropylthioxanthone, 2-hydroxy-2-methyl-1-phenylpropan-1-one, 2-benzyl-2-dimethylamino-(4-morpholinophenyl) butan-1-one, ketals such as acetophenone dimethyl ketal and benzyl dimethyl ketal, bis (2,6-dimethylbenzoyl)-2,4,4-trimethylpentylphosphine oxide, 2,4,6 trimethylbenzoyl-diphenylphosphine oxide, 2,4,6-trimethoxybenzoyldiphenylphosphine oxide, aminoacetophenones such as 2-methyl-1-[4-(methylthio)phenyl]-2-morpholinopropan-1-one, 2-benzyl-2-dimethylamino-1-(4-morpholinophenyl)-butan-1-one, and N,N-dimethylaminoacetophenone, 2,2-dimethoxy-1,2-diphenylethan-1-one or 5,7-diiodo-3-butoxy-6-fluorone, dimer of 2,4,5-triaryl imidazole; riboflavin tetrabutylate; thiol compounds such as 2-mercaptobenzimidazole, 2-mercaptobenzoxazole, and 2-mercaptobenzothiazole; 2,4,6-tris-S-triazine; organic halogen compounds such as 2,2,2-tribromoethanol and tribromomethyl phenyl sulfone; or xanthones.

Suitable commercial photoinitiators include Irgacure™ 184, Irgacure™ 500, Irgacure™ 369, Irgacure™ 1700, Irgacure™ 651, Irgacure™ 819, Irgacure™ 1000, Irgacure™ 1300, Irgacure™ 1870, Darocur™ 1173, Darocur™ 2959, Darocur™ 4265 and Darocur™ ITX available from IGM Resins Ltd, Lucerin™ TPO available from BASF AG, Esacure™ KT046, Esacure™ KIP150, Esacure™ KT37 and Esacure™ EDB available from IGM, H-Nu™ 470 and H-Nu™ 470X available from SPECTRA GROUP Ltd.

A preferred amount of photoinitiator is 0.1-20 wt. %, more preferably 2-15 wt. %, and most preferably 3-10 wt. % of the total weight of the composition.

In order to increase the photosensitivity further, the composition may additionally contain co-initiators. Suitable examples of co-initiators can be categorized in three groups: 1) tertiary aliphatic amines such as methyldiethanolamine, dimethylethanolamine, triethanolamine, triethylamine and N-methylmorpholine; (2) aromatic amines such as amylparadimethyl-aminobenzoate, 2-n-butoxyethyl-4-(dimethylamino) benzoate, 2-(di methylami no)-ethyl benzoate, ethyl-4-(dimethylamino)benzoate, and 2-ethylhexyl-4-(dimethylamino)benzoate; and (3) (meth)acrylated amines such as dialkylamino alkyl(meth)acrylates (e.g., diethylaminoethylacrylate) or N-morpholinoalkyl-(meth)acrylates (e.g., N-morpholinoethyl-acrylate). The preferred co-initiators are aminobenzoates.

These known and commonly used photopolymerization initiators may be used either singly or in the form of a mixture of two or more members.

Further, a titanocene compound such as CGI-784 (product of Ciba Specialty Chemicals and the like which exhibit absorption in a visible region may be added to promote the photochemical reaction. The photopolymerization initiator is not limited to the particular compounds enumerated above. Any compounds which absorb light in the ultraviolet region or visible region and cause radical polymerization of the unsaturated groups such as (meth) acryloyl groups may be used either singly or in the form of a combination of plural members irrespective of the photopolymerization initiator or the photo-initiator aid.

The radical initiator may be a thermal radical initiator such as an O-imino-iso-urea compound as described in U.S. Pat. No. 8,664,288 and in "Thermal radical initiator derivatives based on O-imino-isourea: Synthesis, polymerization, and characterization, Beomjin Kim, Dong Geun Lee, Dong Yeon Kim, Hyeok Jin Kim, Nam Sik Kong, Jin Chul Kim, Seung Man Noh, Hyun Wook Jung, Young I L Park, (J. Polym. Sci. Part A: Polym. Chem. 54 (2016) 3593-3600)".

In some aspects of the invention, the thermal radical initiator may also be utilised as a blocking group on an isocyanate compound as described in "Kevin Injoe Jung, Beomjin Kim, Dong Geun Lee, Tae-Hee Lee, Seo Yeon Choi, Jin Chul Kim, Seung Man Noh, Young I I Park and Hyun Wook Jung, Characteristics of dual-curable blocked isocyanate with thermal radical initiator for low-temperature curing of automotive coatings, Progress in Organic Coatings, 125, (160-166), (2018)".

In some examples, the jettable composition comprises:
  10 wt % or less of one or more reactive monomer, oligomer or prepolymer of an epoxy or oxetane resin;
  70 wt % or more of one or more free radical polymerisable compound;
  5 wt % or less of one or more thermal cross-linking agent; and 10 wt % or less of one or more radical initiator.

In some examples, the jettable composition comprises:
- a novolac type epoxy resin;
- a vinyl ether acrylate and a mono- or tri-functional acrylate as free radical polymerisable compounds;
- an HDI biuret and a triazine compound as thermal cross-linking agents; and
- one or more radical initiator, optionally in the amounts set out above.

In some examples, the weight percentage ratio of reactive monomer, oligomer or prepolymer containing at least one epoxy or oxetane functional group to thermal cross-linking agent is in the range of from 5:1 to 1:5, for example in the range of from 3:1 to 1:1.

Colorant

In some examples, the jettable composition comprises one or more colorant. The colorant may comprise a pigment or a dye. In some examples, the colorant is present in the composition in an amount of less than 10 wt. %, less than 9 wt. %, less than 8 wt. %, less than 7 wt. %, less than 6 wt. %, less than 5 wt. %, less than 4 wt. %, less than 3 wt. %, less than 2 wt. %, for example less than 1 wt. %, for example about 0.5 wt % based on the total solids content of the composition. In some examples, the colorant is added to the composition as a 15% dispersion in an amount in the range of from 1 to 10 wt. %, for example from 2 to 9 wt. %, for example from 3 to 7 wt. %, for example from 3 to 5 wt. %.

Additives

The jettable composition may further comprise one or more additives, for example one or more reactive diluents, antifoams, anti-tarnishing agents, levelling agents, pigment dispersants, polymerization inhibitors, surfactants, adhesion promoters, cure accelerators, thixotroping agents, inert fillers or flame retardants.

Such additives are known in the art and need no further discussion.

In some examples, the viscosity of the composition is no more than 20 mPa·s at 45° C., for example between 1 and 18 mPa·s at 45° C., for example between 4 and 14 mPa·s at 45° C. Compositions having a viscosity in this range are suited for industrial inkjet printing.

In some examples, the composition is a high viscosity composition and has a viscosity of less than 200 mPa·s at 25° C., for example less than 190 mPa·s at 25° C., for example less than 180 mPa·s at 25° C., for example less than 170 mPa·s at 25° C., for example less than 160 mPa·s at 25° C., for example about 150 mPa·s at 25° C.

In some examples, the composition has a viscosity in the range of from 50 mPa·s to 200 mPa·s at 25° C., for example in the range of from 75 mPa·s to 190 mPa·s at 25° C., for example in the range of from 100 mPa·s to 180 mPa·s at 25° C., for example in the range of from 125 mPa·s to 170 mPa·s, for example in the range of from 140 mPa·s to 160 mPa·s at 25° C. High viscosity compositions can be prepared by modifying the amounts of components in the compositions, in particular by varying the ratio between the reactive monomers and oligomers, as described herein.

In some examples, the surface tension of the composition is in the range of 18 to 70 mN/m at 25° C., for example in the range of 20 to 50 mN/m at 25° C. Compositions having a surface tension in this range provide for high print quality and adhesion.

Electronic Device

According to a second aspect there is provided an electronic device, comprising a dielectric substrate having on a first surface thereof an electrically conductive pattern and a composition as described herein. In some examples, the electronic device is or comprises a printed circuit board.

In some examples, the dielectric substrate comprises a non-conductive material such as a paper/resin composite or a resin/fibre glass composite, a ceramic substrate, a polyester or a polyimide. In some examples, the composition is selectively patterned on the first surface of the dielectric substrate. In some examples, the composition is selectively patterned on the first surface of the dielectric substrate in that it is printed so as to form a substantially identical pattern to the electrically conductive pattern, and be aligned with the electrically conductive pattern. For example, the composition may only be printed on top of the electrically conductive pattern. The composition may be printed on top of the electrically conductive pattern so as to encapsulate and insulate the electrically conductive pattern from the environment.

In some examples, the dielectric substrate further comprises an electrically conductive pattern on a second surface thereof. The dielectric substrate may further comprise a composition as described herein selectively patterned so as to substantially encapsulate the electrically conductive pattern on the second surface of the dielectric substrate.

In some examples, the composition is present on the first and/or second surface of the dielectric substrate in an at least partially cured state. For example, the composition may be in an at least partially thermally cured state, an at least partially radiation cured state or both an at least partially thermally cured and at least partially radiation cured state on the dielectric substrate.

In some examples, the electrically conductive pattern on the first and/or second surface of the dielectric substrate is formed from any electrically conductive metal or alloy. In some examples, the electrically conductive metal or alloy comprises one or more of gold, silver, palladium, nickel, tin, lead, aluminium, and copper.

In some examples, the electronic device is a single-sided device, a double-sided device or a multilayer device, with each side or layer having an electrically conductive pattern or trace thereon. In some examples, the electronic device is or comprises a flexible dielectric substrate.

Method

According to a third aspect, a method is provided, comprising jetting a jettable composition as described herein onto a dielectric substrate having an electrically conductive pattern on a first surface thereof; and curing the jetted composition.

The composition as described herein may be jetted using any suitable ink-jet printer for printing solder resist compositions or insulating compositions onto electrical circuit boards. Examples of such printers include the PiXDRO range from Meyer Burger.

In some examples, the composition is selectively jetted onto the first surface of the dielectric substrate and the electrically conductive pattern, so as to substantially encapsulate the electrically conductive pattern. Such selective jetting is possible through the use of an inkjet printer and suitable CAD files.

In some examples, curing the jetted composition comprises exposing the composition to electron beam radiation or actinic radiation, for example UV radiation. If UV radiation curing is used, the light source may be a UV light emitting diode (UV LED) light source.

In some examples, curing the jetted composition comprises thermally treating the jetted composition. In some examples, the jetted composition is thermally treated before, after or concurrent with curing using actinic radiation. In some examples, the jetted composition is thermally treated after curing using actinic radiation.

In some examples, thermally treating comprises treatment at a temperature greater than 80° C., greater than 100° C., greater than 150° C., greater than 170° C., greater than 200° C., greater than 220° C., or greater than 240° C., greater than 250° C. In some examples, thermally treating comprises treatment at a temperature less than 250° C., less than 230° C., less than 210° C., less than 190° C., less than 170° C., less than 150° C., less than 130° C., less than 110° C., or less than 90° C. In some examples, thermally treating comprises treatment at a temperature from 80° C. to 250° C., for example from 100° C. to 200° C., for example from 120° C. to 170° C. The thermal treatment is typically carried out between 15 and 90 minutes.

EXAMPLES

Methods

Example Method of Ink Preparation

Compositions are prepared by first dissolving the solid components (e.g. solid epoxy resin and initiators) in one or more of the low viscosity liquid components. Colourants are predispersed by suitable dispersing method (e.g. ball/bead mills). The colourant dispersion is then add to the solution of solid components together with remaining liquid components and blended by hand or by using a suitable mixer and then filtered through a 1 micron glass disc filter available from Pall Corporation.

Viscosity is checked and adjusted using one or more of the liquid components.

Substrate Preparation

Substrates may be cleaned before coating by mechanical/abrasive methods such as brushing, jet pumice or pumice, or by chemical pretreatment methods such as detergent or solvent cleaning, microetching, controlled oxidation methods or other surface treatments such as surface energy modifying treatments.

Coating of the Inkjet Compositions

To evaluate adhesion, solvent and solder resistance, example coatings listed in Table 1 were coated using a 25 μm K-bar coating wire rod to give a coating thickness of 15 μm and UV cured, followed by thermal cure at 150° C. for 60 minutes.

The coated compositions were evaluated after UV curing for cure speed/curing efficiency and for final properties such as adhesion and solvent resistance after thermal cure.

Prints of the Inkjet Compositions

To evaluate resistance to ENIG (electroless nickel immersion gold) and tin immersion plating solutions, the inks were jetted on to a PCB test piece using a Meyer Burger LP50 ink jet printer. Inks were coated with two or three passes, to achieve a thickness of about 30 microns or 45 microns and "pin cured" using a 395 nm UV LED light source. Samples were then "UV bumped" at 2000 mJ from a medium pressure Hg vapour lamp and thermally cured at 150° C. for 60 minutes. After plating (see below), test pieces were examined using a 10× magnifying glass, for evidence of blistering, delamination, surface attack of the coating and/or colour change of the coating or circuit traces. Coating adhesion was evaluated by cutting a 3×3 grid pattern in the cured coating, over areas of metal circuitry, using a scalpel. Grid cuts were spaced 1 mm apart. After cutting the grid, the adhesion was evaluated by applying a self-adhesive tape (Scotch 600) to the surface, removing by hand and inspecting visually for removal of the coating from the grid and surrounding areas.

Plating Protocols

Pretreatment

For all samples, regardless of immersion test, the following pretreatment was performed:
1. Cleaner—Pro Select SF K. Operating Temp 45° C. Immersion Time 4 mins.
2. Cleaner Etch—Microetch SF. Operating Temp 26° C. Immersion Time 2 mins.

For the immersion tin, the following protocol was followed:

Immersion solution: Stannatech 2000V from Atotech UK Ltd.

Operating temperature 75° C.; immersion time: approx. 20 minutes.

For ENIG immersion, the following protocol was followed;
1. Activation—Aurotech Activator 1000. Operating Temp 25 C. Immersion Time 1½ mins.
2. Electroless Nickel—Aurotech CNN Mod. Operating Temp 85° C. Immersion Time approx. 25 mins.
3. Immersion Gold—Aurotech CS 9000. Operating Temp 85° C. Immersion Time approx. 12 to 16 mins.

Between pre-treatment or individual steps, samples were washed using either running tap water or deionized water (final rinse).

Viscosity Measurement

The viscosity of the compositions was measured at 25° C. using a Brookfield DV-II+ Pro viscometer, with Spindle #18, at a speed of 100 rpm.

Surface Tension

Surface tension of the compositions was measured using an Interfacial Surface Tension Meter, Model #BZY201 from Shanghai Fangrui Instrument Co. Ltd Curing Efficiency of Inkjet Compositions The coated inkjet inks were evaluated by eye and touch after UV curing for cure speed and given a rating from 1 (very dry) to 5 (wet).

X-Hatch Adhesion

X-hatch adhesion was measured by cutting a 3×3 grid pattern in the cured coating using a scalpel. Grid cuts were spaced 1 mm apart. After cutting the grid, the adhesion was evaluated by applying a self-adhesive tape (Scotch 600) to the surface and removing by hand. A visual evaluation resulted in an adhesion quality ranging from 1 (very good adhesion) to 5 (very poor adhesion).

Evaluation of Solder Resistance

The solder resistance of the coatings was evaluated using a SPL600240 Digital Dynamic Solder Pot available from L&M PRODUCTS filled with a "K" Grade 63:37 tin/lead solder from SOLDER CONNECTION. The temperature of the solder was set at 260° C.

Using a cotton wool ball, a solder flux SC7560A from SOLDER CONNECTION was applied on the surface of the samples (i.e. coatings of the composition on a copper surface) where the X-hatch adhesion test had been carried out to clean the surface. The solder flux was dried by placing the samples for 1 minute above the solder pot.

A solder wave was created and the samples were passed over the wave four times (5 secs/pass), allowing them to cool before rinsing and refluxing between each pass, after which the samples were rinsed and allowed to cool to room temperature.

The adhesion of the solder mask compositions on the copper surface was then evaluated with the X-hatch adhesion method described above.

Storage Stability

Storage stability was evaluated by measuring the percentage increase in viscosity at 25° C. of the composition after storage for 28 days at 60° C.

Example Compositions

Compositions were prepared with the compositions as shown in Table 1 and Table 2 below.

TABLE 1

|  | Example | | | | | | | | | |
|---|---|---|---|---|---|---|---|---|---|---|
|  | 1 wt. % | 2 wt. % | 3 wt. % | 4 wt. % | 5 wt. % | 6 wt. % | 7 wt. % | 8 wt. % | 9 wt. % | 10 wt. % |
| Reactive Monomer 1 | 5.85 | 5.85 |  |  | 9.18 | 9.18 | 9.18 | 9.18 | 9.35 | 9.67 |
| Reactive Monomer 2 |  |  |  |  |  |  |  |  |  |  |
| Reactive Monomer 3 |  |  |  |  |  |  |  |  |  |  |
| Reactive Monomer 4 |  |  |  |  | 4.85 |  |  |  |  |  |
| Reactive Monomer 5 |  |  |  |  |  |  |  |  |  |  |
| Reactive Monomer 6 |  |  | 9.67 |  |  |  |  |  |  |  |
| Reactive Monomer 7 |  |  |  | 9.67 |  |  |  |  |  |  |
| Reactive Monomer 8 |  |  |  |  |  |  |  |  |  |  |
| Reactive Monomer 9 |  |  |  |  |  |  |  |  |  |  |
| Reactive Monomer 10 |  |  |  |  |  |  |  |  |  |  |
| Reactive Monomer 11 |  |  |  |  |  |  |  |  |  |  |
| Reactive Monomer 12 |  |  |  |  |  | 4.85 |  |  |  |  |
| Reactive Monomer 13 |  |  |  |  |  |  | 4.85 |  |  |  |
| Reactive Monomer 14 |  |  |  |  |  |  |  | 4.85 |  |  |
| Reactive Monomer 15 |  |  |  |  |  |  |  |  | 3.09 |  |
| Reactive Monomer 16 |  | 5.85 |  |  |  |  |  |  |  |  |
| Reactive Monomer 17 |  |  |  |  |  |  |  |  |  |  |
| Free radical polymerisable compound 1 |  |  |  | 9.67 |  |  |  |  |  |  |
| Free radical polymerisable compound 2 |  |  |  |  |  |  |  |  |  |  |
| Free radical polymerisable compound 3 | 11.70 | 5.85 | 13.81 | 4.14 | 13.12 | 13.15 | 13.15 | 13.15 | 13.39 | 11.05 |
| Free radical polymerisable compound 4 | 64.33 | 64.33 | 60.77 | 60.77 | 57.74 | 57.72 | 57.72 | 57.72 | 58.79 | 60.67 |
| Free radical polymerisable compound 5 |  |  |  |  |  |  |  |  |  |  |
| Photoinitiator 1 | 2.34 | 2.34 | 2.21 | 2.21 | 2.10 | 2.10 | 2.10 | 2.10 | 2.14 | 2.21 |
| Photoinitiator 2 | 3.51 | 3.51 | 3.31 | 3.31 | 3.15 | 3.15 | 3.15 | 3.15 | 3.21 | 3.31 |
| Photoinitiator 3 | 1.17 | 1.17 | 1.10 | 1.10 | 1.05 | 1.05 | 1.05 | 1.05 | 1.07 | 1.10 |
| Polymerisation inhibitor | 0.58 | 0.58 | 0.55 | 0.55 | 0.63 | 0.63 | 0.63 | 0.63 | 0.64 | 0.66 |
| Thermal cross-linking agent 1 | 5.85 | 5.85 | 4.14 | 4.14 | 3.94 | 3.94 | 3.94 | 3.94 | 4.01 | 1.38 |
| Thermal cross-linking agent 2 |  |  |  |  |  |  |  |  |  | 5.52 |
| Pigment | 4.68 | 4.68 | 4.42 | 4.42 | 4.24 | 4.24 | 4.24 | 4.24 | 4.32 | 4.42 |
| Reactive Monomer 18 |  |  |  |  |  |  |  |  |  |  |
| Curing agent |  |  |  |  |  |  |  |  |  |  |
| Total | 100 | 100 | 100 | 100 | 100 | 100 | 100 | 100 | 100 | 100 |
| UV Cure speed | 1 | 3 | 1 | 2 | 1 | 1 | 2 | 2 | 1 | 1 |
| CH$_2$Cl$_2$ resistance | 2 | 2 | 2 | 2 | 2 | 2 | 2 | 1 | 2 | 2 |
| Solder resistance | 2 | 2 | 1 | 1 | 2 | 1 | 1 | 2 | 1 | 1 |
| ENIG (30 mic) | 4 | 4 | 4 | 4 | 4 | 4 | 5 | 4 | 4 | 1 |
| ENIG (45 mic) |  |  |  |  |  |  |  |  |  |  |
| Imm Sn |  |  |  |  |  |  |  |  |  | 3 |

|  | Example | | | | | | | |
|---|---|---|---|---|---|---|---|---|
|  | 11 wt. % | 12 wt. % | 13 wt. % | 14 wt. % | 15 wt. % | 16 wt. % | 17 wt. % | 18 wt. % |
| Reactive Monomer 1 | 4.60 | 4.19 | 4.19 | 4.19 | 8.33 |  |  |  |
| Reactive Monomer 2 |  |  |  |  |  |  |  |  |
| Reactive Monomer 3 |  |  |  |  |  |  |  |  |
| Reactive Monomer 4 |  |  |  |  |  |  |  |  |
| Reactive Monomer 5 |  |  |  |  |  | 8.33 |  |  |
| Reactive Monomer 6 |  |  |  |  |  |  | 8.33 |  |
| Reactive Monomer 7 |  |  |  |  |  |  |  | 8.33 |
| Reactive Monomer 8 |  |  |  |  |  |  |  |  |
| Reactive Monomer 9 |  |  |  |  |  |  |  |  |
| Reactive Monomer 10 |  |  |  |  |  |  |  |  |
| Reactive Monomer 11 |  |  |  |  |  |  |  |  |
| Reactive Monomer 12 |  |  |  |  |  |  |  |  |
| Reactive Monomer 13 |  |  | 11.73 |  |  |  |  |  |
| Reactive Monomer 14 |  |  |  |  |  |  |  |  |
| Reactive Monomer 15 |  |  |  |  | 11.73 |  |  |  |
| Reactive Monomer 16 |  |  |  |  |  |  |  |  |
| Reactive Monomer 17 |  |  |  | 11.73 |  |  |  |  |
| Free radical polymerisable compound 1 |  |  |  |  |  |  |  |  |
| Free radical polymerisable compound 2 |  |  |  |  |  |  |  |  |
| Free radical polymerisable compound 3 | 6.13 | 4.19 | 4.19 | 4.19 | 8.35 | 8.35 | 8.35 | 8.35 |
| Free radical polymerisable compound 4 | 68.47 | 62.36 | 62.36 | 62.36 | 67.88 | 67.88 | 67.88 | 67.88 |
| Free radical polymerisable compound 5 |  |  |  |  |  |  |  |  |

TABLE 1-continued

|  | | | | | | | | |
|---|---|---|---|---|---|---|---|---|
| Photoinitator 1 | 2.49 | 2.23 | 2.23 | 2.23 | 2.43 | 2.43 | 2.43 | 2.43 |
| Photoinitator 2 | 3.73 | 3.42 | 3.42 | 3.42 | 3.72 | 3.72 | 3.72 | 3.72 |
| Photoinitator 3 | 1.24 | 1.12 | 1.12 | 1.12 | 1.22 | 1.22 | 1.22 | 1.22 |
| Polymerisation inhibitor | 0.75 | 0.70 | 0.70 | 0.70 | 0.76 | 0.76 | 0.76 | 0.76 |
| Thermal cross-linking agent 1 | 1.53 | | | | | | | |
| Thermal cross-linking agent 2 | 6.13 | 5.59 | 5.59 | 5.59 | 4.05 | 4.05 | 4.05 | 4.05 |
| Pigment | 4.91 | 4.47 | 4.47 | 4.47 | 3.24 | 3.24 | 3.24 | 3.24 |
| Reactive Monomer 18 | | | | | | | | |
| Curing agent | | | | | | | | |
| Total | 100 | 100 | 100 | 100 | 100 | 100 | 100 | 100 |
| UV Cure speed | 2 | 2 | 2 | 2 | 1 | 1 | 1 | 1 |
| $CH_2Cl_2$ resistance | 2 | 2 | 4 | 3 | 2 | 2 | 2 | 4 |
| Solder resistance | 3 | 4 | 3 | 3 | 2 | 2 | 2 | 4 |
| ENIG (30 mic) | 1 | | | | | | | |
| ENIG (45 mic) | | | | | | | | |
| Imm Sn | 3 | | | | | | | |

TABLE 2

| | Example | | | | | | | |
|---|---|---|---|---|---|---|---|---|
| | 19 wt. % | 20 wt. % | 21 wt. % | 22 wt. % | 23 wt. % | 24 wt. % | 25 wt. % | 26 wt. % |
| Reactive Monomer 1 | | | | | 9.78 | | | 9.78 |
| Reactive Monomer 2 | | | | | | 9.78 | | |
| Reactive Monomer 3 | | | | | | | 9.78 | |
| Reactive Monomer 4 | | | | | | | | |
| Reactive Monomer 5 | | | | | | | | |
| Reactive Monomer 6 | | | | | | | | |
| Reactive Monomer 7 | | | | | | | | |
| Reactive Monomer 8 | 8.33 | | | | | | | |
| Reactive Monomer 9 | | 8.33 | | | | | | |
| Reactive Monomer 10 | | | 8.33 | | | | | |
| Reactive Monomer 11 | | | | 8.33 | | | | |
| Reactive Monomer 12 | | | | | | | | |
| Reactive Monomer 13 | | | | | | | | |
| Reactive Monomer 14 | | | | | | | | |
| Reactive Monomer 15 | | | | | | | | |
| Reactive Monomer 16 | | | | | | | | |
| Reactive Monomer 17 | | | | | | | | |
| Free radical polymerisable compound 1 | | | | | | | | |
| Free radical polymerisable compound 2 | | | | | | | | |
| Free radical polymerisable compound 3 | 8.35 | 8.35 | 8.35 | 8.35 | 10.61 | 10.61 | 10.61 | 11.17 |
| Free radical polymerisable compound 4 | 67.88 | 67.88 | 67.88 | 67.88 | 62.85 | 62.85 | 62.85 | 62.86 |
| Free radical polymerisable compound 5 | | | | | | | | |
| Photoinitator 1 | 2.43 | 2.43 | 2.43 | 2.43 | 2.29 | 2.29 | 2.29 | 2.25 |
| Photoinitator 2 | 3.72 | 3.72 | 3.72 | 3.72 | 3.43 | 3.43 | 3.43 | 3.45 |
| Photoinitator 3 | 1.22 | 1.22 | 1.22 | 1.22 | 1.14 | 1.14 | 1.14 | 1.13 |
| Polymerisation inhibitor | 0.76 | 0.76 | 0.76 | 0.76 | 0.69 | 0.69 | 0.69 | 0.70 |
| Thermal cross-linking agent 1 | | | | | 0.84 | 0.84 | 0.84 | 1.40 |
| Thermal cross-linking agent 2 | 4.05 | 4.05 | 4.05 | 4.05 | 3.91 | 3.91 | 3.91 | 2.79 |
| Pigment | 3.24 | 3.24 | 3.24 | 3.24 | 4.47 | 4.47 | 4.47 | 4.47 |
| Reactive Monomer 18 | | | | | | | | |
| Curing agent | | | | | | | | |
| Total | 100 | 100 | 100 | 100 | 100 | 100 | 100 | 100 |
| UV Cure speed | 1 | 1 | 2 | 3 | 1 | 1 | 1 | 1 |
| $CH_2Cl_2$ resistance | 4 | 1 | 3 | 3 | 2 | 2 | 3 | 2 |
| Solder resistance | 4 | 3 | 2 | 5 | 2 | 2 | 2 | 1 |
| ENIG (30 mic) | | | | | 1 | | | 1 |
| ENIG (45 mic) | | | | | | | | |
| Imm Sn | | | | | 3 | | | 2 |

| | Example | | | | | | |
|---|---|---|---|---|---|---|---|
| | 27 | 28 | 29 | 30 | 31 | 32 | 33 |
| Reactive Monomer 1 | 8.5 | 8.8 | 8.8 | 8.8 | 8.8 | 8.8 | 8.8 |
| Reactive Monomer 2 | | | | | | | |
| Reactive Monomer 3 | | | | | | | |
| Reactive Monomer 4 | | | | | | | |
| Reactive Monomer 5 | | | | | | | |
| Reactive Monomer 6 | | | | | | | |
| Reactive Monomer 7 | | | | | | | |
| Reactive Monomer 8 | | | | | | | |

TABLE 2-continued

| | | | | | | | |
|---|---|---|---|---|---|---|---|
| Reactive Monomer 9 | | | | | | | |
| Reactive Monomer 10 | | | | | | | |
| Reactive Monomer 11 | | | | | | | |
| Reactive Monomer 12 | | | | | | | |
| Reactive Monomer 13 | | | | | | | |
| Reactive Monomer 14 | | | | | | | |
| Reactive Monomer 15 | | | | | | | |
| Reactive Monomer 16 | | | | | | | |
| Reactive Monomer 17 | | | | | | | |
| Free radical polymerisable compound 1 | | | | | 17.6 | | 17.6 |
| Free radical polymerisable compound 2 | | 17.6 | 17.6 | 17.6 | 17.6 | 17.6 | 17.6 |
| Free radical polymerisable compound 3 | 23.8 | 45.6 | 45.55 | 45.55 | 27.9 | 45.6 | 27.85 |
| Free radical polymerisable compound 4 | | | | | | | |
| Free radical polymerisable compound 5 | 54.7 | 14.1 | 14.1 | 14.1 | 14.1 | 14.1 | 14.1 |
| Photoinitator 1 | | | | | | | |
| Photoinitator 2 | 4.7 | 4.7 | 4.7 | 4.7 | 4.7 | 4.7 | 4.7 |
| Photoinitator 3 | 0.6 | 0.6 | 0.6 | 0.6 | 0.6 | 0.6 | 0.6 |
| Polymerisation inhibitor | 0.6 | 0.6 | 0.6 | 0.6 | 0.6 | 0.6 | 0.6 |
| Thermal cross-linking agent 1 | 1.2 | 1.45 | 1.45 | 1.45 | 1.45 | 1.45 | 1.45 |
| Thermal cross-linking agent 2 | 2.4 | 2.9 | 2.9 | 2.9 | 2.9 | 2.9 | 2.9 |
| Pigment | 3.5 | 3.7 | 3.7 | 3.7 | 3.7 | 3.7 | 3.7 |
| Reactive Monomer 18 | | | 3.5 | | 2.9 | 2.9 | 2.9 |
| Curing agent | | | | 0.2 | 0.1 | | 0.1 |
| Total | 100.0 | 100.0 | 103.5 | 100.2 | 102.9 | 103.0 | 102.8 |
| UV Cure speed | 1 | 1 | 1 | 1 | 1 | 1 | 1 |
| CH$_2$Cl$_2$ resistance | 2 | 1 | 1 | 1 | 1 | 1 | 1 |
| Solder resistance | 1 | 1 | 1 | 1 | 1 | 1 | 1 |
| ENIG (30 mic) | 1 | 4 | 2 | 2 | 2 | 2 | |
| ENIG (45 mic) | 1 | 1 | 1 | 1 | 1 | 1 | |
| Imm Sn | | | | | | | |

Reactive Monomer 1: Epoxy cresol novolac (NPCN-704 from Nanya); Reactive Monomer 2: Epoxy cresol novolac (Epiclon N680 from DIC Corporation); Reactive Monomer 3: Epoxy cresol novolac (ECN 1273 from Huntsman); Reactive Monomer 4: Bisphenol-A epoxy (GY260 from Huntsman); Reactive Monomer 5: Cycloaliphatic epoxy (EHPE3150 from Daicel); Reactive Monomer 6: Polymeric epoxy novolac (Epiclon SU-8 from Miller Stephenson); Reactive Monomer 7: Dicyclopentadiene type epoxy (HP-7200 HH from DIC Corporation); Reactive Monomer 8: Dicyclopentadiene type epoxy (HP-9500 from DIC Corporation); Reactive Monomer 9: Bisphenol-A epoxy (GT 6610 from Huntsman); Reactive Monomer 10: Epoxy phenol novolac (DEN 438 from DOW); Reactive Monomer 11: Bisphenol—F epoxy (GY285 from Huntsman); Reactive Monomer 12: Cycloaliphatic epoxy (Omnilane 2005 from IGM resins); Reactive Monomer 13: Oxetane cyclic ether monomer (Aron OXT-221 from Toagosei); Reactive Monomer 14: Cycloaliphatic epoxy (Uvicure S-140 from Lambsons); Reactive Monomer 15: Epoxy functional silane (Silquest A-186 from Momentive); Reactive Monomer 16: Epoxy monomer/diluent (Erisys GE21 from CVC Thermoset Specialities; Reactive Monomer 17: Epoxy monomer/diluent (Araldite DY-T from Huntsman); Free radical polymerisable compound 1: Monofunctional acrylate monomer (Miramer M1130 from Miwon); Free radical polymerisable compound 2: Trifunctional acrylate monomer (trimethylolpropane triacrylate from Sigma-Aldrich); Free radical polymerisable compound 3: Vinyl ethoxy ether acrylate (VEEA from Nippon Shokubai); Free radical polymerisable compound 4: Monofunctional acrylate monomer (SR339 from Arkema); Free radical polymerisable compound 5: Cyclic trimethylol-propane formal acrylate (SR531 from Arkema); Photoinitator 1: Omnirad 4-PBz from IGM Resins; Photoinitator 2: Omnirad 808 from IGM Resins; Photoinitator 3: ITX from IGM Resins; Polymerisation inhibitor: Genorad G22 from Rahn; Thermal cross-linking agent 1: Blocked isocyanate biuret (BI 7960 from Baxenden Chemicals); Thermal cross-linking agent 2: Amino cross-linker (Larotact 150 from BASF); Pigment: Blue/yellow pigment dispersions (SIC PY150/SICPB154 from Speciality Industrial Chemical); Reactive Monomer 18: Epoxy functional silane (MP200 from Azelis). Curing agent: CASAMID 780 accelerated dicyandiamide from Thomas Swan).

In Examples 29 to 33 of Table 2, Reactive Monomer 18 and Curing Agent were added to 100 part formulations of the other components listed.

As can be seen in Table 1 and Table 2, compositions in accordance with the present disclosure exhibit one or more advantageous properties selected from UV cure speed, solvent (dichloromethane) resistance, solder resistance, and resistance to ENIG (electroless nickel immersion gold) and tin immersion. In all instances, an evaluation of 1 or 2 is considered acceptable in terms of processing or performance criteria.

The invention claimed is:

1. A jettable composition, comprising:
    a reactive monomer, oligomer or prepolymer containing at least one epoxy or oxetane functional group, wherein the reactive monomer, oligomer or prepolymer containing at least one epoxy or oxetane functional group comprises one or more of a phenol novolac type epoxy resin, and a cresol novolac type epoxy resin;
    a free radical polymerizable compound, wherein the free radical polymerizable compound comprises one or more vinyl ether containing compound and/or one or more (meth) acrylate group containing compound;
    a thermal cross-linking agent comprising an isocyanate compound and a triazine compound, wherein the isocyanate compound is a blocked isocyanate compound; and
    a photoinitiator, wherein the ratio of reactive monomer, oligomer or prepolymer containing at least one epoxy or oxetane functional group to thermal cross-linking agent is in the range of from 3:1 to 1:1.

2. The jettable composition of claim 1, wherein the reactive monomer, oligomer or prepolymer containing at least one epoxy or oxetane functional group further comprises one or more of a bisphenol-A type epoxy resin, bisphenol-F type epoxy resin, a dicyclopentadiene type epoxy, a cycloaliphatic epoxy compound, epoxy ether, epoxy silane, glycidyl ether, glycidyl ester, glycidyl amine and oxetane monomer.

3. The jettable composition of claim 1, wherein the free radical polymerizable compound comprises a compound having a vinyl ether group and a (meth) acrylate group.

4. The jettable composition of claim 1, wherein the free radical polymerizable compound does not contain a hydroxyl substituent.

5. The jettable composition of claim 1, wherein the triazine compound comprises a tris (alkoxycarbonylamino) triazine.

6. The jettable composition of claim 1, wherein the free radical polymerizable compound comprises a hydroxy-containing monomer radical polymerizable compound in a molar ratio of triazine compound to hydroxyl group of no more than 1:2.

7. The jettable composition of claim 1, wherein the jettable composition comprises one or more thermal initiator.

8. The jettable composition of claim 1, further comprising one or more reactive diluents, antifoams, anti-tarnishing agents, levelling agents, colorants, pigment dispersants, polymerization inhibitors, surfactants, adhesion promoters, cure accelerators, thixotroping agents or flame retardants.

9. The jettable composition of claim 1, comprising:
   10 wt % or less of one or more reactive monomer, oligomer or prepolymer of an epoxy or oxetane resin;
   70 wt % or more of one or more free radical polymerisable compound;
   5 wt % or less of one or more thermal cross-linking agent; and
   10 wt % or less of one or more photoinitiator.

10. The jettable composition of claim 1, wherein the reactive monomer, oligomer or prepolymer of an epoxy or oxetane resin comprises an epoxy cresol novolac resin having an epoxy equivalent weight of from 190 g/Eq to 230 g/Eq.

11. A method of manufacturing an electronic device, comprising:
   jetting a jettable composition according to claim 1 onto a dielectric substrate having an electrically conductive pattern on a first surface thereof; and
   curing the jetted composition.

12. The method of claim 11, wherein curing the jetted composition comprises exposing the composition to actinic radiation or electron beam radiation concurrent with printing and/or after printing.

13. The method of claim 11, wherein the jetted composition is thermally treated before, after or concurrent with curing using actinic radiation, wherein thermally treating comprises treatment at a temperature from 80° C. to 250° C.

14. The method of claim 11, wherein the composition is jetted onto the first surface of the dielectric substrate and the electrically conductive pattern.

15. An electronic device, comprising a dielectric substrate having on a first surface thereof an electrically conductive pattern and the composition of claim 1.

16. The electronic device of claim 15, wherein the composition is in a cured state.

17. The electronic device of claim 15, wherein the dielectric substrate comprises a non-conductive material selected from a paper/resin composite or a resin/fibre glass composite, a ceramic substrate, a polyester or a polyimide.

18. The electronic device of claim 15, wherein the electrically conductive pattern is formed from any electrically conductive metal or alloy, wherein the electrically conductive metal or alloy comprises one or more of gold, silver, palladium, nickel, tin, lead, aluminium, and copper.

19. The electronic device of claim 15, wherein the dielectric substrate further comprises on a second surface thereof an electrically conductive pattern and a jettable composition, comprising: a reactive monomer, oligomer or prepolymer containing at least one epoxy or oxetane functional group; a free radical polymerizable compound; a thermal cross-linking agent comprising one or more agent selected from an isocyanate compound and a triazine compound; and a radical initiator.

20. The electronic device of claim 15, wherein the electronic device is a printed circuit board.

* * * * *